United States Patent [19]
Takada, deceased

[11] 3,915,402
[45] Oct. 28, 1975

[54] BELT MOUNTED AUTOMATIC LOCKING RETRACTOR REEL

[75] Inventor: Takezo Takada, deceased, late of Tokyo, Japan, by Juichiro Takada, legal heir

[73] Assignee: Takata Kojyo Co., Ltd., Tokyo, Japan

[22] Filed: Mar. 1, 1974

[21] Appl. No.: 447,444

[30] Foreign Application Priority Data
Mar. 3, 1973  Japan............................ 48-26290[U]

[52] U.S. Cl.............................. 242/107.4; 297/388
[51] Int. Cl.² .................... B65H 75/48; B60R 21/10
[58] Field of Search ......... 242/107.4, 107; 297/385, 297/388; 280/150 SB; 24/230 A, 77

[56] References Cited
UNITED STATES PATENTS
| | | | |
|---|---|---|---|
| 3,301,593 | 1/1967 | Lamb.................................. | 297/388 |
| 3,341,250 | 9/1967 | Rasmussen.......................... | 297/388 |
| 3,606,454 | 9/1971 | Dorn................................... | 297/388 |

Primary Examiner—Edward J. McCarthy
Attorney, Agent, or Firm—Wolder & Gross

[57] ABSTRACT

An automatic retractor unit is located at the free end of a vehicle safety belt and includes a forward tongue releasably coupled to a buckle and rearwardly located bracket supporting a spring biased retractor reel winding the belt and provided with side ratchet wheels. A pawl member is swingably supported for movement into and out of ratchet wheel engagement and is coupled by a leaf spring to the bracket base, the leaf spring having forwardly convergent legs which terminate in a depending follower. In the buckled uncoupled position, the pawl member is retained out of engagement with the ratchet wheels and upon insertion of the tongue into the buckle, the buckle top wall engages the follower to advance the spring to move the pawl into ratchet engagement to brake the reel against belt withdrawal, while permitting belt retraction rotation.

6 Claims, 4 Drawing Figures

BELT MOUNTED AUTOMATIC LOCKING RETRACTOR REEL

BACKGROUND OF THE INVENTION

The present invention relates generally to improvements in vehicle safety belt systems, and it relates more particularly to an improved safety belt retractor reel of the automatic locking type which is mounted on a free end of a safety belt.

The conventional vehicle safety belt retractor reel is of the type in which the reel is mounted to the vehicle frame or seat and connected to one end of the belt, the other end of the belt carrying a releasable coupling member, such as a buckle or a mating tongue. This type of arrangement, particularly where the reel is of the automatic locking type, possesses an important drawback. The reel device in the aforesaid type of system is generally of great bulk, is at best difficult and inconvenient, especially in compact cars where the available space for such a device is greatly limited. To overcome this drawback, it has been proposed to mount the retractor reel at the free, coupling carrying end of the belt so that a simple anchoring connection is all that is required to anchor the belt to the vehicle. However, such reel devices heretofore available and proposed possess numerous disadvantages. They are generally complex and expensive devices of low reliability and limited application, and otherwise leave much to be desired.

SUMMARY OF THE INVENTION

It is a principal object of the present invention to provide an improved vehicle safety belt system.

Another object of the present invention is to provide an improved safety belt retractor reel of the automatic belt braking type.

Still another object of the present invention is to provide an improved automatic locking belt retractor reel of the type mounted at the free end of the belt and which carries a releasable coupling member.

A further object of the present invention is to provide a belt end mounted retractor reel which responds to the coupling thereof, and is locked against belt withdrawal, but resiliently retracts the belt when in a coupled condition.

Still a further object of the present invention is to provide a device of the above nature characterized by its high reliability, ruggedness, simplicity, low cost, ease and convenience of application, installation and use, and its great versatility and adaptability.

The above and other objects of the present invention will become apparent from a reading of the following description, taken in conjunction with the accompanying drawings which illustrate a preferred embodiment thereof.

In a sense, the present invention contemplates the provision of a safety belt system comprising a pair of separably interlocking first and second coupling members, the first coupling member including a bracket supporting a spring biased retractor reel having affixed thereto a ratchet reel. A pawl member is movable into and out of engagement with the ratchet wheel and actuating means including a spring member is motivated in response to the engagement of the coupling members to urge the pawl into engagement with the ratchet wheel by way of the spring to lock the reel against belt withdrawal while permitting the reel to rotate in a belt retracting direction, the pawl being retained in a ratchet disengage position when the coupling members are separated.

In the preferred form of the present device, the bracket includes two side walls between which the reel extends and is rotatably supported and biased in a belt retracting direction by a helical spring. A ratchet wheel is disposed at each end of the reel and the pawl member is rockably supported by the bracket side walls and includes a ratchet element associated with each ratchet wheel. The pawl member is connected to the base of the bracket by a leaf spring including forwardly converging legs whose free ends are connected to the bracket base and pawl member and whose convergent ends are joined by depending legs terminating in a follower section. The first coupling member is a tongue and the second coupling member is a buckle having an inclined top face so that when the tongue is inserted into the buckle, the buckle top face engages the follower section to swing the spring forward end upwardly, whereby to urge the pawl member to its ratchet engage position by way of the spring member.

The improved retractor reel device is highly reliable, rugged, of low cost, easy and convenient to install and apply, and is of great versatility and adaptability.

DESCRIPTION OF THE PREFERRED EMBODIMENT

Figure 1:
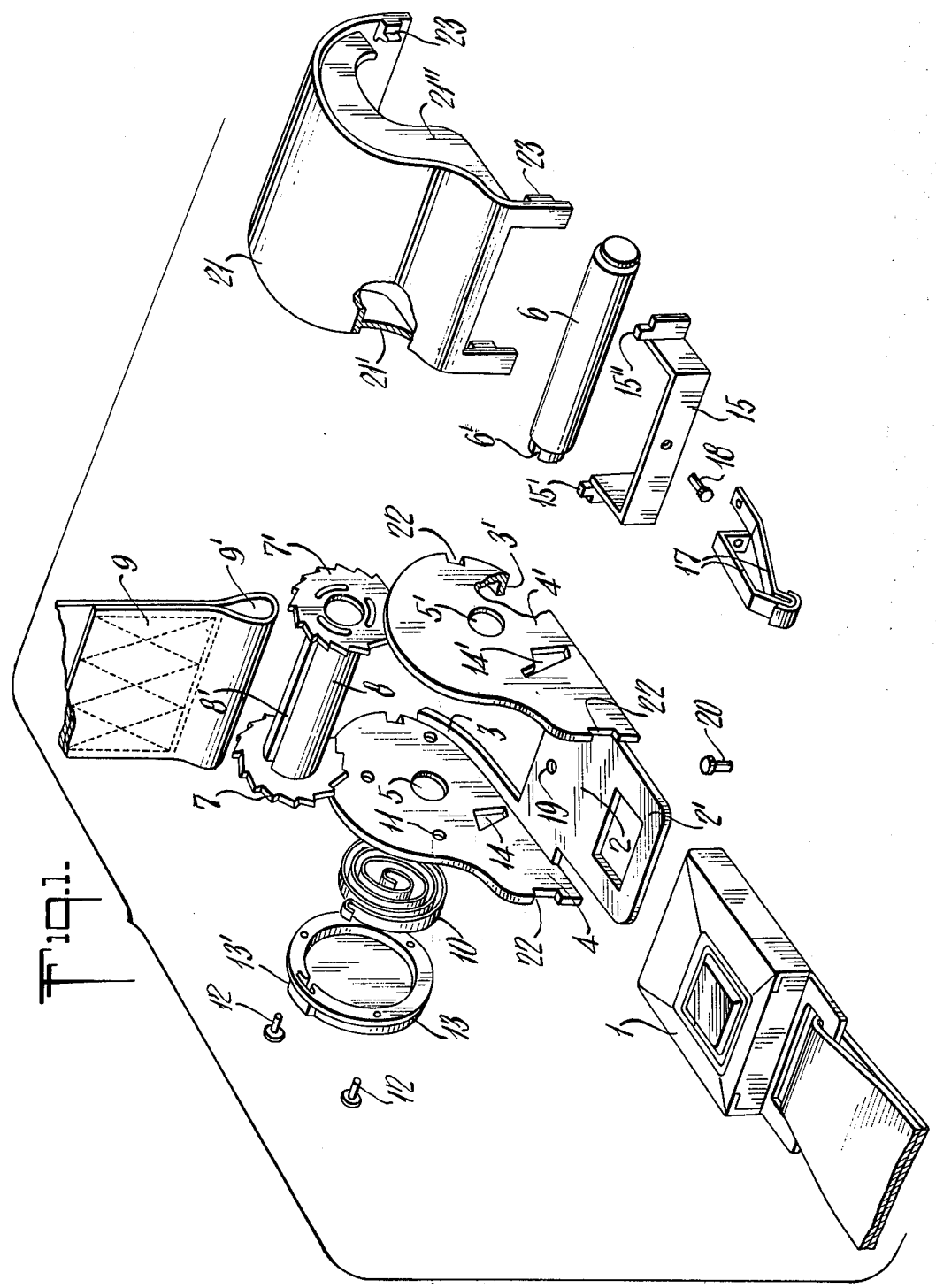
FIG. 1 is an exploded perspective view of a reel device embodying the present invention.

Referring now to the drawings which illustrate a preferred embodiment of the present invention, the reference numeral 1 generally designates a buckle coupling member of conventional construction which includes a top wall which slopes upwardly from the front coupling tongue receiving section of the buckle to the tongue release button thereof. Releaseably, lockably, engageable with the buckle 1, which is attached to a suitable anchoring member, is the forwardly projecting substantially flat mating tongue section 2' of a tongue member 2, whose rear portion is a mounting bracket including upwardly directed parallel side walls 4, 4' having inwardly directed belt guide flanges 3, 3' along their curved bottom edges. The forward side edges of tongue section 2' is inwardly spaced from side walls 4, 4'.

Formed in the side walls 4, 4' is a pair of transversely aligned holes 5, 5' in which is journalled a transverse shaft 6 which has a section projecting beyond side wall 4 and having an end slot 6' formed therein. A reel 8 is mounted on shaft 6 and is provided at its opposite ends with ratchet wheels 7, 7' proximate side walls 4, 4'. A longitudinal slot 8' is formed in reel 8 and the looped end 9' of a safety belt 9 passes through slot 8' and engages and encircles shaft 6 and the shaft 6, ratchet wheels 7, 7' and reel 8 rotate as a unit and when rotating in a belt retracting direction winds the belt on reel 8, and when the belt 9 is withdrawn, the reel 8 rotates in an opposite direction.

A helical spring 10 is positioned along the outside face of side wall 4 and has an inner end engaging the slot 6'. A cup shaped shell 13 houses the spring 10 and is secured to the side wall 4 by screws 12 engaging tapped holes 11 in side wall 4. A recess 13' is formed in the peripheral wall of shell 13 and engages the outer end of helical spring 10 to bias and urge the reel 8 to rotate in a belt retracting direction.

Formed in the walls 4, 4' forward and below the ratchet wheels 7, 7' a pair of transversely aligned segment shaped openings 14, 14'. A pawl member 15, U-shaped so as not to interfere with the belt wound on reel 8, includes a forward cross piece and forwardly directed side arms terminating in outwardly directed legs which rockably engage the holes 14, 14' to permit the limited swinging of the pawl member 15. Pawl elements 15',15" project upwardly from the outwardly directed legs and move with the advance and retracted swinging of pawl member 15 respectively into and out of engagement with respective ratchet wheels 7, 7'.

Extending between the pawl member 15 and the tongue member 2 is a V-shaped pawl actuating member 17 formed of leaf spring material and including forwardly converging upper and lower resilient legs terminating in downwardly, forwardly inclined sections joined to a follower element 16. The upper spring leg terminates in an apertured depending lug which is connected by a rivet 18 to a medial point on the cross piece of pawl member 15 and the free end section of the bottom spring leg is secured to the rear section of tongue member 2 by a rivet 20 engaging an aperture 19 in tongue member 2. In the unstressed condition of actuating member 17 the pawl member 15 is retracted so that pawl elements 15', 15" are out of engagement with ratchet wheels 7, 7' and the follower element 16 is above the level of tongue section 2' a distance about equal to the vertical distance between the leading edge of buckle 1 and the top edge of the tongue receiving opening therein. Thus, with the insertion of tongue section 2' into the buckle 1, the top face of the buckle 1 engages the underface of follower element 16 to raise the follower element 16 and resiliently urge the member 15 to a ratchet engage position by way of the actuator spring member 17.

Coupling notches 22 are formed in the front and rear peripheral edges of bracket side walls 4, 4'. A resilient cover shell 21 is molded of a polymeric resin and includes a curved top wall located above and parallel for a major part with the top edges of side walls 4, 4' and terminating at its rear with a depending rear wall and at its front with depending side legs. Projecting inwardly from the cover depending side legs and rear wall are lugs 23 which snap fit the notches 22 to retain the cover 21 in closed condition. Depending from the shell top wall inwardly of the side edges thereof are peripherally extending belt guide defining flanges 21', 21".

Figure 2:
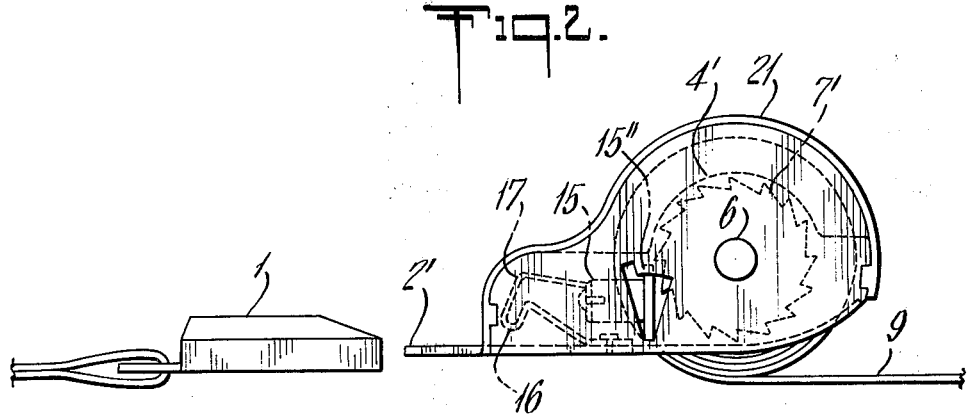
FIG. 2 is a side elevational view of the device in an uncoupled belt released condition.
Figure 3:
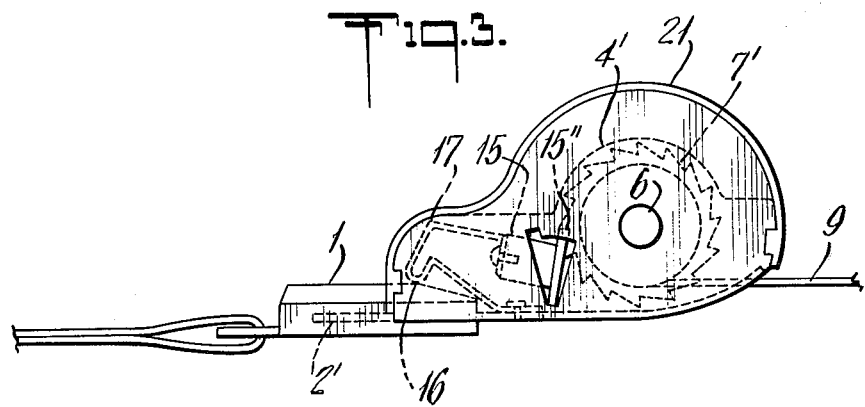
FIG. 3 is a view similar to FIG. 2 showing the device in a coupled condition and the belt being retracted.
Figure 4:
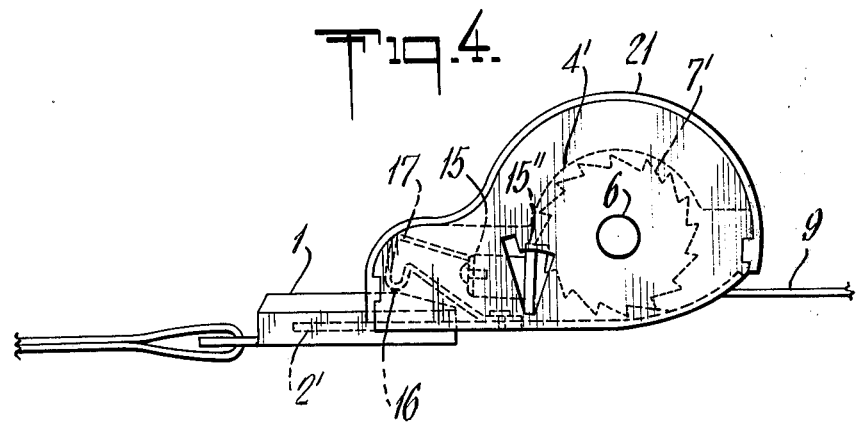
FIG. 4 is a view similar to FIG. 3 showing the device in a coupled condition, and in which the belt is retracted and locked in an occupant engaging position.

Considering now the operation of the improved device, when the passenger does not wear the safety belt 9, as shown in FIG. 2, it is wound on the reel 8. The buckle 1 is not coupled to the tongue member 2, and the pawl elements 15', 15" of the pawl member 15 are disengaged from the ratchet wheels 7, 7' under the influence of the pawl actuating spring member 17. When applying the safety belt, the belt 9 is withdrawn or reeled out from the reel 8, and the tongue member 2 is inserted into the buckle proper 1, as shown in FIG. 3. As a consequence, the upper surface of buckle proper 1 engages and raises the follower element 16 of the spring actuator 17 to raise the actuator 17 and swing the pawl member 15 and resiliently advance the pawl elements 15', 15" into engagement with the ratchet wheels 7, 7' so as to brake the withdrawal of the belt 9. When the passenger withdraws the belt 9 in excess of that required, the pawl member 15 is urged outwardly by the ratchet wheels 7, 7', as shown in FIG. 4, as the recoiling force of the helical spring 10 overcomes the spring force of the actuator spring 17. The belt 9 is thus retracted until it fits to the body of the passenger. When next the passenger uncouples the buckle proper to remove the safety belt, the upper surface of the buckle proper 1 is disengaged from the follower element 16 of the pawl actuating spring 17, and the pawl member 15 is returned to the position shown in FIG. 2. Since the ratchet wheels 7, 7' are disengaged from the pawl elements 15', 15", the belt 9 is retracted and wound on the reel 8 under the recoiling force of the helical spring 10, as it is guided by the belt guides 3, 3' on the side walls 4, 4' and guide flanges 21', 21" on the top cover.

While there has been described and illustrated a preferred embodiment of the present invention, it is apparent that numerous alterations, omissions and additions may be made without departing from the spirit thereof.

It is claimed:

1. An automatic locking vehicle safety belt system comprising a pair of separable interlocking first and second coupling members, said first coupling member including a bracket section, a reel rotatably mounted on said bracket section, spring means urging said reel to rotate in a belt retracting direction, a belt wound on and extending from said reel to ananchor point on the vehicle, a ratchet wheel rotatable with said reel, a pawl member located on said first coupling member and movable between an advanced position engaging said ratchet wheel to prevent the belt withdrawal rotation thereof and a retracted position out of engagement with said ratchet wheel and normally urged to said retracted position, and actuating means including a spring member mounted on said first coupling member and connected to said pawl member, said spring member having a portion positioned to engage a surface of said second coupling member during the coupling of the second coupling member to said first coupling member whereby said second coupling member stresses said spring member in a direction to resiliently urge said pawl member to its advanced position locking said reel against belt withdrawal rotation while permitting the belt retraction rotation thereof.

2. The system of claim 1 wherein said second coupling member comprises a buckle, including a tongue receiving throat at an end thereof and said first coupling member comprises a tongue insertable through said throat into coupling engagement with said buckle.

3. The system of claim 2 wherein said actuating means spring member extends between said pawl member and said first coupling member and in its unstressed position retains said pawl member in its retracted position, said buckle when coupled to said tongue bearing on said spring member at a point spaced from said pawl member to advance said pawl member by way of said spring member.

4. The system of claim 3 wherein said pawl member is swingably supported by said bracket about a predetermined axis between its advanced and retracted positions, and said spring member comprises a V-shaped leaf spring, including forwardly conveying upper and lower resilient arms, the upper arm being connected to said pawl member at a point offset from said axis and the lower arm being connected to said tongue, and a follower disposed at the junction of said arms, said buckle in coupled condition to said tongue engaging said follower to swing advance said pawl member by way of said spring member upper arm.

5. The system of claim 4, including a forwardly, downwardly inclined arm extending from the forward end of said upper spring arm to the forward end of said lower spring arm.

6. A compact automatic locking type belt winding device for receiving the belt by a tongue portion comprising a buckle proper one and a tongue member two constituting the vehicle safety belt buckle, side walls (4, 4′) provided at the rear part of the tongue member and having belt guides (3, 3′), a belt winding reel (8) having a pair of small ratchet wheels (7, 7′), a reel shaft (6), a belt retracting helical spring (10) engaging the reel shaft (6), a U-shaped pawl member (15) mounted in the proximity of the ratchet wheels (7, 7′), a pawl actuating spring member (17) mounted for connecting the pawl member (15) and the tongue member (2) and having a portion engageable with the upper surface of the buckle proper (1), and a reel cover (21) having belt guides (3, 3′) on the both sides, characterized in that, upon connecting the buckle to the tongue member, the upper surface of the buckle proper (1) thrusts the pawl actuating spring member (17) upwards to bring the pawl member (15) into meshing engagement with small ratchet wheels (7, 7′) and interfere with the reeling out of the belt (9), and the small ratchet wheels (7, 7′) operate automatically to wind the belt (9) so as to suit the body of the passenger for locking the belt so that the recoiling force of the belt reel-out helical spring (10) overcomes the spring force of the pawl actuating spring member (17).

* * * * *